US008660416B2

(12) United States Patent
Asakawa et al.

(10) Patent No.: US 8,660,416 B2
(45) Date of Patent: Feb. 25, 2014

(54) OPTICAL UNIT WITH SHAKE CORRECTING FUNCTION

(71) Applicant: Nidec Sankyo Corporation, Nagano (JP)

(72) Inventors: Shinroku Asakawa, Nagano (JP); Shinji Minamisawa, Nagano (JP); Tatsuki Wade, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 13/664,969

(22) Filed: Oct. 31, 2012

(65) Prior Publication Data

US 2013/0136437 A1 May 30, 2013

(30) Foreign Application Priority Data

Nov. 28, 2011 (JP) ................................. 2011-258685

(51) Int. Cl.
*G03B 17/00* (2006.01)
*G02B 27/64* (2006.01)
(52) U.S. Cl.
USPC ............................................ 396/55; 359/554
(58) Field of Classification Search
USPC ................. 396/55; 348/208.99, 208.4, 208.7, 348/208.11; 359/554, 555, 557
See application file for complete search history.

(56) References Cited

U.S. PATENT DOCUMENTS

2011/0103782 A1* 5/2011 Tsuruta et al. .................. 396/55

FOREIGN PATENT DOCUMENTS

JP 2010-96803 A 4/2010

* cited by examiner

*Primary Examiner* — W B Perkey
*Assistant Examiner* — Minh Phan
(74) *Attorney, Agent, or Firm* — Cantor Colburn LLP

(57) ABSTRACT

An optical unit with a shake correcting function may include a fixed body, a movable body holding an optical element, a swing support point which supports the movable body so that the movable body is capable of swinging, a spring member formed in a plate shape for urging the movable body toward the swing support point, a shake correction drive mechanism structured to swing the movable body with the swing support point as a swing center, a first stopper part which is protruded in a direction perpendicular to the optical axis direction on a front side in the optical axis direction of the movable body with respect to the spring member for determining a moving range of the movable body, and a second stopper part which is structured to face the first stopper part in the optical axis direction through the spring member on the rear side in the optical axis direction of the fixed body with respect to the spring member for determining a moving range of the movable body in the optical axis direction by restricting movement of the first stopper part.

16 Claims, 11 Drawing Sheets

OPTICAL UNIT WITH SHAKE CORRECTING FUNCTION

CROSS REFERENCE TO RELATED APPLICATION

The present invention claims priority under 35 U.S.C. §119 to Japanese Application No. 2011-258685 filed Nov. 28, 2011, the entire contents of which are incorporated herein by reference.

FIELD OF THE INVENTION

At least an embodiment of the present invention may relate to an optical unit with a shake correcting function which is mounted on a cell phone with a camera or the like.

BACKGROUND

In recent years, cell phones have included optical devices on which an optical unit for photography is mounted. In the optical unit, in order to restrain or reduce any disturbance of a photographed image due to a shake in the hand of a user, a technique has been proposed in which a movable body provided with an optical element such as a lens is set to be in a supported state by a fixed body through a plate-shaped spring member and, when a shake is detected, the movable body is swung by a magnetic drive mechanism in a direction for correcting the shake with a swing support point as a swing center (see, Japanese Patent Laid-Open No. 2010-96803).

However, in a case of the structure in which the movable body is supported by a plate-shaped spring member, when the movable body is largely displaced in a direction perpendicular to an optical axis direction due to an impact applied to the movable body, a malfunction such that the plate spring is plastically deformed and damaged may occur. Further, also in a case that an impact is applied to the movable body to make the movable body largely displace in the optical axis direction, a malfunction such that the plate spring is plastically deformed and damaged may occur.

SUMMARY

In view of the problem described above, at least an embodiment of the present invention may advantageously provide an optical unit with a shake correcting function which is capable of preventing occurrence of malfunction due to displacement of a movable body due to an impact even when the movable body is urged toward a swing support point by a spring member and is supported so as to be capable of swinging.

According to at least an embodiment of the present invention, there may be provided an optical unit with a shake correcting function including a fixed body, a movable body which holds an optical element, a swing support point which supports the movable body between a rear end portion in an optical axis direction of the movable body and the fixed body so that the movable body is capable of swinging, a spring member which is formed in a plate shape and is provided with a fixed body side connecting part connected with the fixed body, a movable body side connecting part connected with the movable body, and an arm part connected with the fixed body side connecting part and the movable body side connecting part, the spring member urging the movable body toward the swing support point, a shake correction drive mechanism which is structured to swing the movable body with the swing support point as a swing center, a first stopper part which is protruded in a direction perpendicular to the optical axis direction on one side of a front side and a rear side in the optical axis direction of the movable body with respect to the spring member for determining a moving range of the movable body when the movable body is displaced in the direction perpendicular to the optical axis direction, and a second stopper part which is structured to face the first stopper part in the optical axis direction through the spring member on the other side of the front side and the rear side in the optical axis direction of the fixed body with respect to the spring member for determining a moving range of the movable body to the other side in the optical axis direction by restricting movement of the first stopper part when the movable body is displaced to the other side in the optical axis direction.

In at least an embodiment of the present invention, a shake correction drive mechanism for swinging the movable body is provided and thus, when a shake such as a shake of hand is occurred in the optical unit, the movable body can be swung to cancel the shake. Therefore, even when the optical unit is shaken, an inclination of the optical axis can be corrected. Further, the optical unit includes a first stopper part which is protruded in a direction perpendicular to the optical axis direction for determining a moving range of the movable body by abutting with a fixed body side when the movable body is displaced in the direction perpendicular to the optical axis direction. Therefore, even when an impact is applied to the movable body and the movable body is displaced in the direction perpendicular to the optical axis direction, the moving range of the movable body is restricted. Accordingly, occurrence of malfunction such that the spring member is plastically deformed and damaged can be prevented. Further, the fixed body is provided with a second stopper part which faces the first stopper part in the optical axis direction. Therefore, even when the movable body is displaced in the optical axis direction, the moving range of the movable body is restricted and thus occurrence of malfunction such that the spring member is plastically deformed to be damaged can be prevented. Further, the first stopper part is utilized for determining both of the moving range in the direction perpendicular to the optical axis direction of the movable body and the moving range in the optical axis direction of the movable body and the first stopper part and the second stopper part are provided at positions sandwiching the spring member. Therefore, when the stopper mechanism is operated, the spring member is hard or difficult to be twisted and a large space is not required for providing the stopper mechanism.

In at least an embodiment of the present invention, when the movable body is displaced to the other side in the optical axis direction, the first stopper part and the second stopper part are abutted with each other through the spring member. According to this structure, in order to determine the moving range in the optical axis direction of the movable body, a structure is not required to be adopted in which the first stopper part and the second stopper part are abutted with each other while avoiding the spring member. Therefore, a structure surrounding the spring member can be simplified.

In at least an embodiment of the present invention, when the movable body is displaced to the rear side in the optical axis direction, at least a part of the arm part is sandwiched by the first stopper part and the second stopper part. According to this structure, the arm part is sandwiched and protected by the first stopper part and the second stopper part and thus, when an impact is applied and the movable body is displaced in the optical axis direction, the arm part is prevented from being plastically deformed.

In at least an embodiment of the present invention, the first stopper part is provided on the front side in the optical axis direction with respect to the spring member, and the second stopper part is provided on the rear side in the optical axis direction with respect to the spring member and, when the movable body is displaced to the rear side in the optical axis direction, the second stopper part restricts movement of the first stopper part for determining a moving range of the movable body to the rear side in the optical axis direction.

In at least an embodiment of the present invention, the shake correction drive mechanism is a magnetic drive mechanism which is provided on the front side in the optical axis direction with respect to the first stopper part. According to this structure, when the movable body is displaced in the direction perpendicular to the optical axis direction, the first stopper part is abutted with the fixed body with a small displacing amount and thus the spring member is surely prevented from being plastically deformed. Specifically, it may be structured that the shake correction drive mechanism includes a sheet-shaped coil body fixed to the fixed body and a permanent magnet fixed to the movable body, and the first stopper part is provided with a protruded part which is protruded toward the sheet-shaped coil body side with respect to the permanent magnet and, when the movable body is largely displaced in the direction perpendicular to the optical axis direction, the protruded part is abutted with the sheet-shaped coil body to restrict further displacement of the movable body. Further, it may be structured that the movable body includes a photographing unit having a lens and an imaging element as the optical element, a holder in a rectangular frame shape which surrounds an outer peripheral face of a case of the photographing unit, and the first stopper part, and the first stopper part is fixed to a face on the rear side in the optical axis direction of the holder, the movable side connecting part of the spring member is fixed to a rear side end face of the first stopper part in the optical axis direction, and the second stopper part is disposed so as to face the arm part of the spring member on the rear side in the optical axis direction with respect to the spring member. In this case, it may be structured that the photographing unit includes a case in a rectangular box shape, and a lens drive mechanism for driving the lens in a focusing direction is provided on an inner side of the case.

In at least an embodiment of the present invention, the first stopper part and the second stopper part are provided on the whole periphery around an optical axis. According to this structure, a large force does not concentrate on parts of the first stopper part and the second stopper part and thus the first stopper part and the second stopper part are hard or difficult to be damaged and the movable body is prevented from being largely inclined on an opposite side to the abutting portion due to reaction when the first stopper part and the second stopper part are abutted with each other. Therefore, the spring member is surely prevented from being plastically deformed.

In at least an embodiment of the present invention, the first stopper part is structured of a first stopper member having a frame shape along an outer peripheral face of the movable body, and the second stopper part is structured of a second stopper member having a frame shape along an inner peripheral face of a cover of the fixed body which covers the movable body.

In at least an embodiment of the present invention, each of the first stopper member and the second stopper member is structured in a rectangular frame shape, and an outer shape dimension of the rectangular frame shape of the first stopper member is larger than an inner shape dimension of the rectangular frame shape of the second stopper member. According to this structure, the first stopper member and the second stopper member are abutted with each other in a face-to-face manner and thus the first stopper member and the second stopper member are hard or difficult to be damaged. Further, since the first stopper member and the second stopper member are abutted with each other in a face-to-face manner, the movable body is prevented from being largely inclined on a side other than the abutting portion due to reaction when the first stopper member and the second stopper member are abutted with each other. Therefore, the spring member is surely prevented from being plastically deformed.

In at least an embodiment of the present invention, the second stopper member is fixed to the cover of the fixed body which covers the movable body by welding. According to this structure, the cover is reinforced by the second stopper member.

In at least an embodiment of the present invention, the second stopper member includes a frame part, which is disposed on the whole periphery of the movable body around the optical axis and structures the frame shape, and a plate-shaped part which is bent in the optical axis direction from the frame part on a side where a flexible circuit board is extended out from an inner side of the fixed body for closing an opening part of the fixed body through which the flexible circuit board is extended out. According to this structure, foreign matter such as dust is prevented from entering through the opening part by the plate-shaped part of the second stopper member.

In at least an embodiment of the present invention, the whole or a part of the arm part of the spring member is overlapped with the second stopper member in the optical axis direction. According to this structure, when viewed in the optical axis direction, the stopper mechanism which utilizes a second frame-shaped member is structured by utilizing the region where the arm part is extended and thus a large space is not required for providing the stopper mechanism.

In at least an embodiment of the present invention, an elastic member having a protruded portion which is protruded toward the movable body is provided at a portion of the fixed body facing a rear end portion of the movable body in the optical axis direction, and the swing support point is structured by abutting the protruded portion of the elastic member with the rear end portion of the movable body in the optical axis direction. According to this structure, the protruded portion of the elastic member is abutted with the rear end portion in the optical axis direction of the movable body and thus, when an impact directing toward the rear side in the optical axis direction is applied to the movable body, the impact is absorbed by the protruded portion of the elastic member and, in addition, since the second stopper part facing the first stopper part in the optical axis direction is provided, occurrence of malfunction such that the spring member is plastically deformed and damaged is prevented. In this case, it may be structured that the plate-shaped spring member includes a fixed side connecting part in a rectangular frame shape which is connected with the fixed body, a movable side connecting part which is connected with the movable body, and a plurality of arm parts which are extended between the movable side connecting part and the fixed side connecting part and, when the movable side connecting part of the spring member is connected with the movable body and the fixed side connecting part is fixed to the fixed body, the movable side connecting part of the spring member is pushed up by the protruded portion of the elastic member to a front side in the optical axis direction with respect to the fixed side connecting part and thereby the movable body is supported by the protruded portion of the elastic member so as to be capable of being swung.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of the present invention will be described below with reference to the accompanying drawings. In the following description, a structure for preventing a hand shake to a photographing unit will be described as an example for an optical unit. Further, in the following description, three directions perpendicular to each other are set to be an "X"-axis, a "Y"-axis and a "Z"-axis and a direction along an optical axis "L" (lens optical axis) is set to be the "Z"-axis. Further, in the following description, regarding swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" is indicated on one side of the "X"-axis, "−X" is indicated on the other side, "+Y" is indicated on one side of the "Y"-axis, "−Y" is indicated on the other side, "+Z" is indicated on one side (opposite side to an object side) of the "Z"-axis, and "−Z" is indicated on the other side (object side).

(Entire Structure of Optical Unit)

Figure 1:
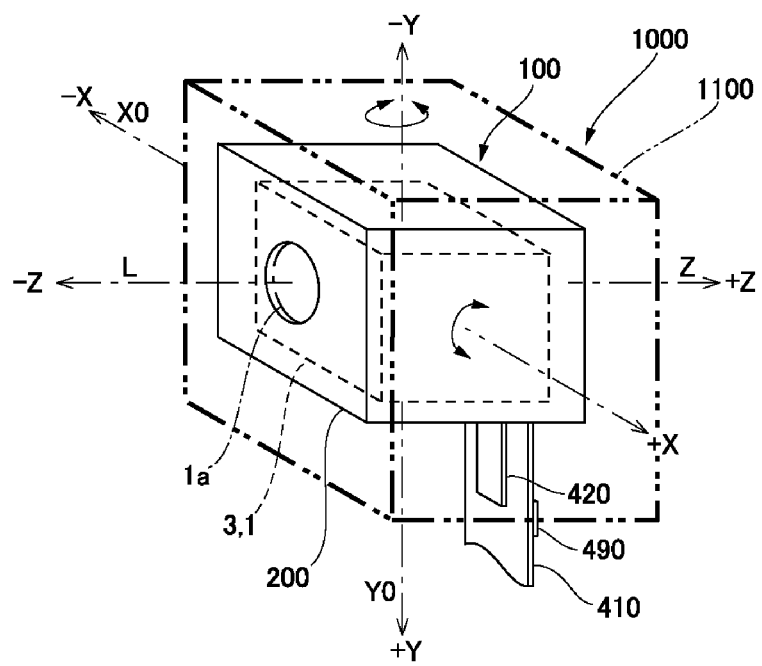
FIG. 1 is an explanatory view schematically showing a state in which an optical unit with a shake correcting function in accordance with an embodiment of the present invention is mounted on an optical device such as a cell phone.
Figure 2A:
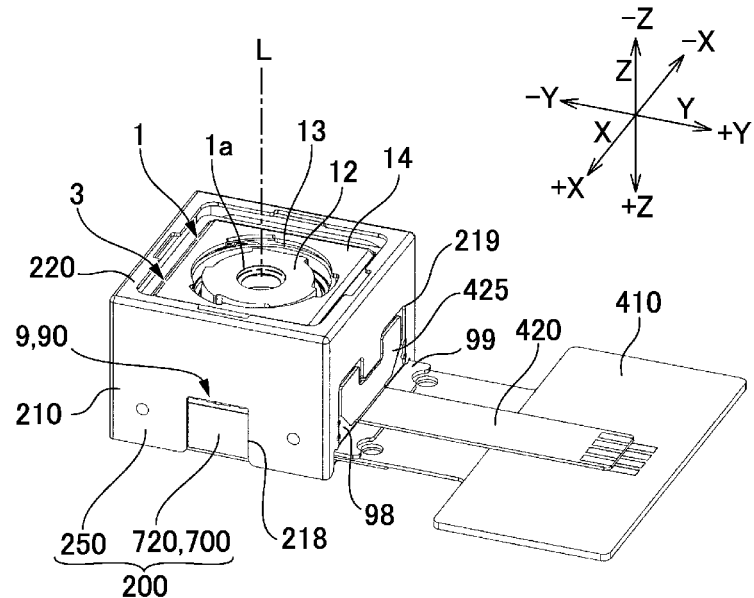
FIGS. 2(a) and 2(b) are perspective views showing an outward appearance of an optical unit with a shake correcting function and the like in accordance with an embodiment of the present invention.
Figure 2B:
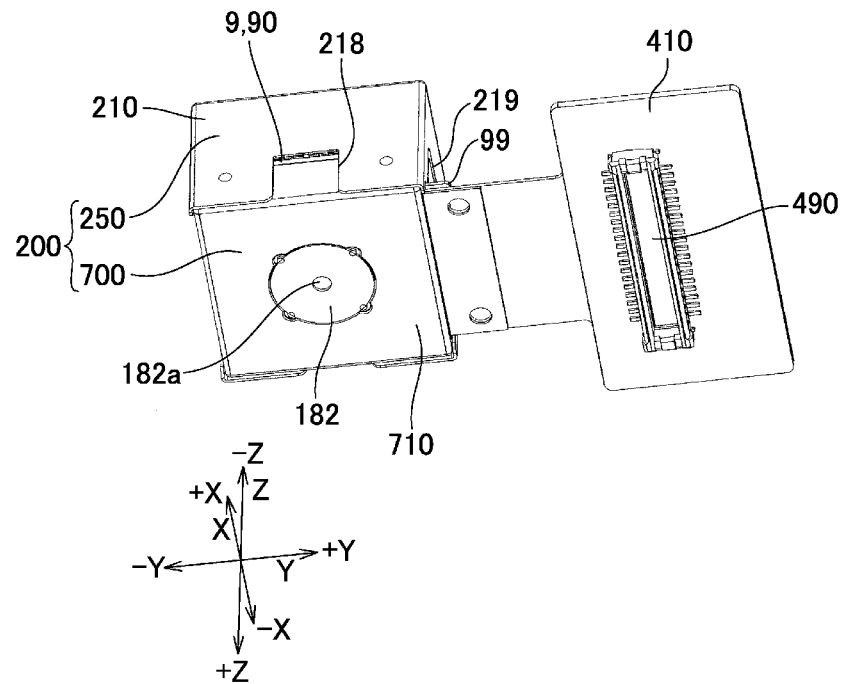
Figure 3A:
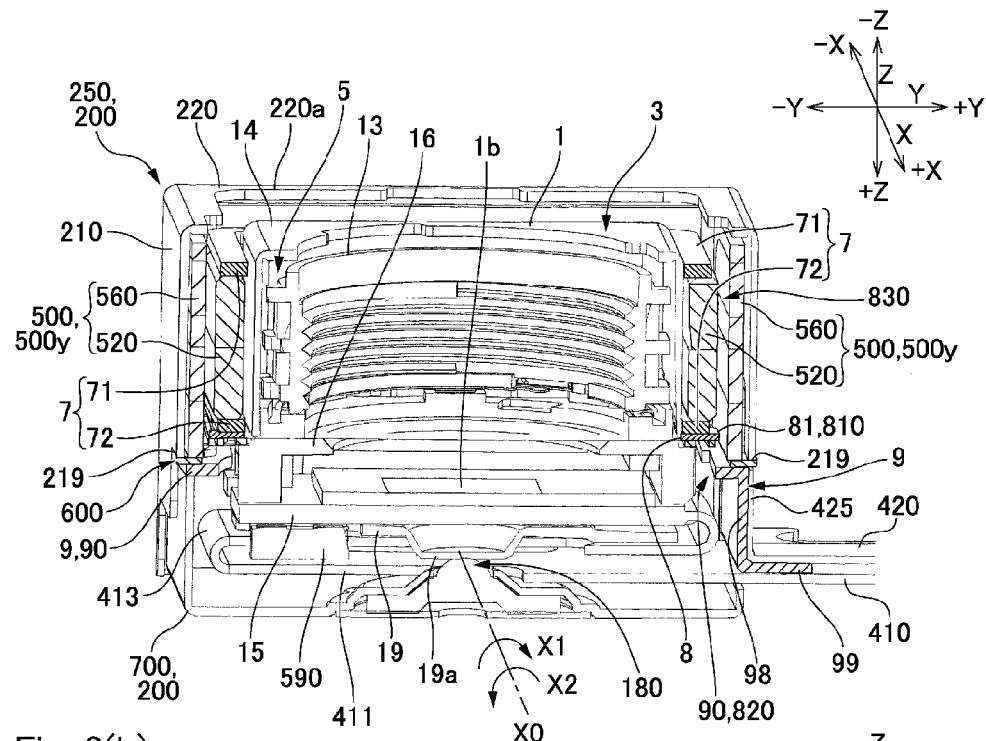
FIGS. 3(a) and 3(b) are cross-sectional views showing an optical unit with a shake correcting function in accordance with an embodiment of the present invention.
Figure 3B:
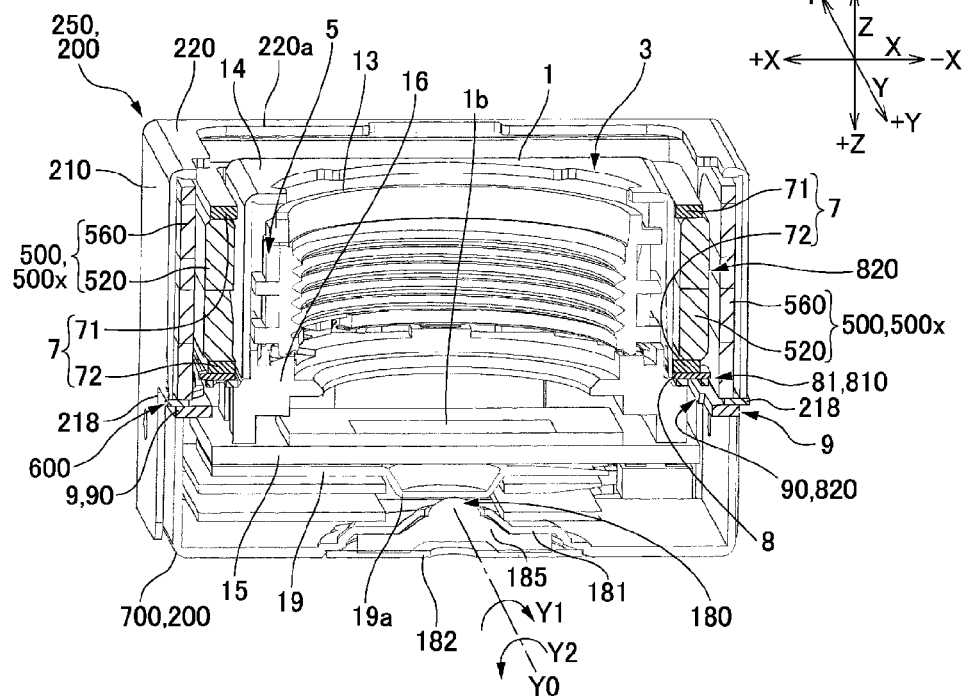

FIG. 1 is an explanatory view schematically showing a state in which an optical unit with a shake correcting function in accordance with an embodiment of the present invention is mounted on an optical device such as a cell phone. This invention is not limited to cell phones however. FIGS. 2(a) and 2(b) are perspective views showing an outward appearance of an optical unit with a shake correcting function and the like in accordance with an embodiment of the present invention. FIG. 2(a) is a perspective view showing the optical unit which is viewed from an object side (front side in an optical axis direction) and FIG. 2(b) is a perspective view showing the optical unit which is viewed from an opposite side to the object side (rear side in the optical axis direction). FIGS. 3(a) and 3(b) are cross-sectional views showing an optical unit with a shake correcting function in accordance with an embodiment of the present invention. FIGS. 3(a) and 3(b) are a "YZ" cross-sectional view and an "XZ" cross-sectional view. Further, in FIGS. 3(a) and 3(b), a lens holder and the like in an inside of a photographing unit are not shown.

An optical unit 100 (optical unit with a shake correcting function) shown in FIG. 1 is a thin camera used in an optical device 1000 such as a cell phone with a camera and is mounted in a supported state on a chassis 1100 (device main body) of the optical device 1000. In the optical unit 100, when a shake such as a hand shake is occurred in the optical device 1000 at the time of photographing, disturbance occurs in a photographed image. Therefore, in the optical unit 100 in this embodiment, as described below, a movable body 3 including a photographing unit 1 is supported within a fixed body 200 so as to be capable of being swung and the optical unit 100 is provided with a shake correction drive mechanism (not shown in FIG. 1) which swings the movable body 3 on the basis of a detection result for a hand shake by a shake detection sensor such as a gyroscope (not shown) mounted on the optical unit 100 or a gyroscope (not shown) mounted on a main body side of the optical device 1000.

As shown in FIG. 1, FIGS. 2(a) and 2(b), and FIGS. 3(a) and 3(b), flexible circuit boards 410 and 420 are extended from the optical unit 100 for supplying power to the photographing unit 1 and the shake correction drive mechanism. The flexible circuit boards 410 and 420 are electrically connected with a host control section or the like which is provided in a main body of the optical device 1000 through a common connector 490 and the like. Further, the flexible circuit board 410 is also provided with a function for outputting a signal from the photographing unit 1. Therefore, the number of wiring lines in the flexible circuit board 410 is large and thus a relatively wide flexible circuit board 410 is used.

The photographing unit 1 includes a case 14 in a rectangular box shape which is made of a ferromagnetic plate such as a steel plate. A holder 12 which holds a lens 1a, a sleeve 13 in a cylindrical tube shape which holds the holder 12, a lens drive mechanism 5 for driving the lens 1a in a focusing direction, an imaging element 1b which is disposed on a rear side in the optical axis direction, an element holder 16 which holds the imaging element 1b and the like are provided on an inner side of the case 14. An outer peripheral portion of the photographing unit 1 is structured of the case 14.

(Structure of Optical Unit 100)

Figure 4A:
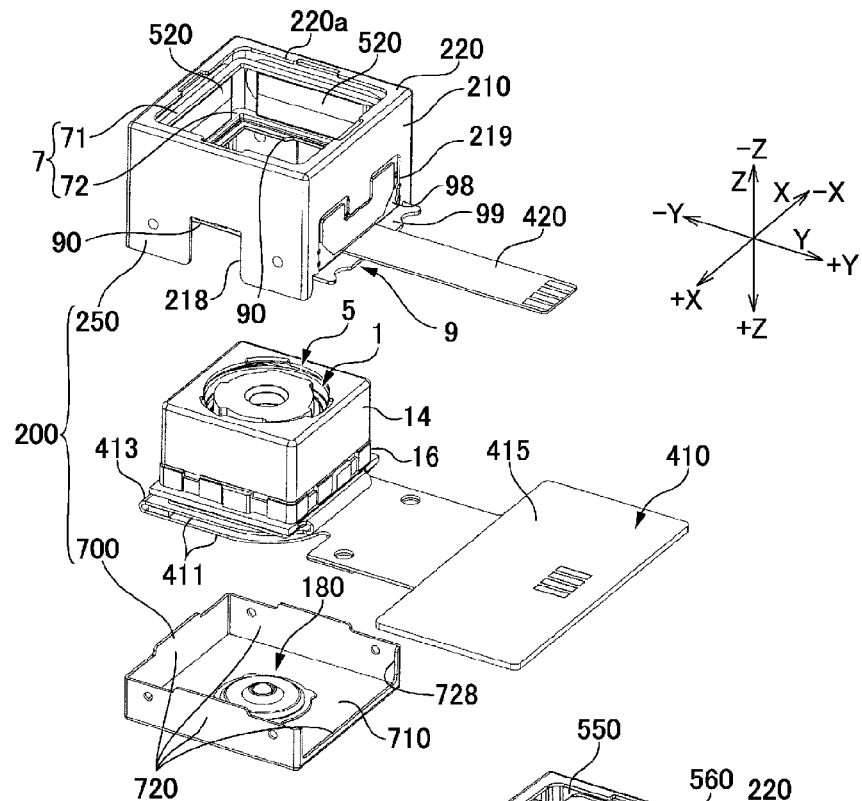
FIGS. 4(a) and 4(b) are exploded perspective views showing an optical unit with a shake correcting function in accordance with an embodiment of the present invention which is viewed from an object to be photographed side.
Figure 4B:
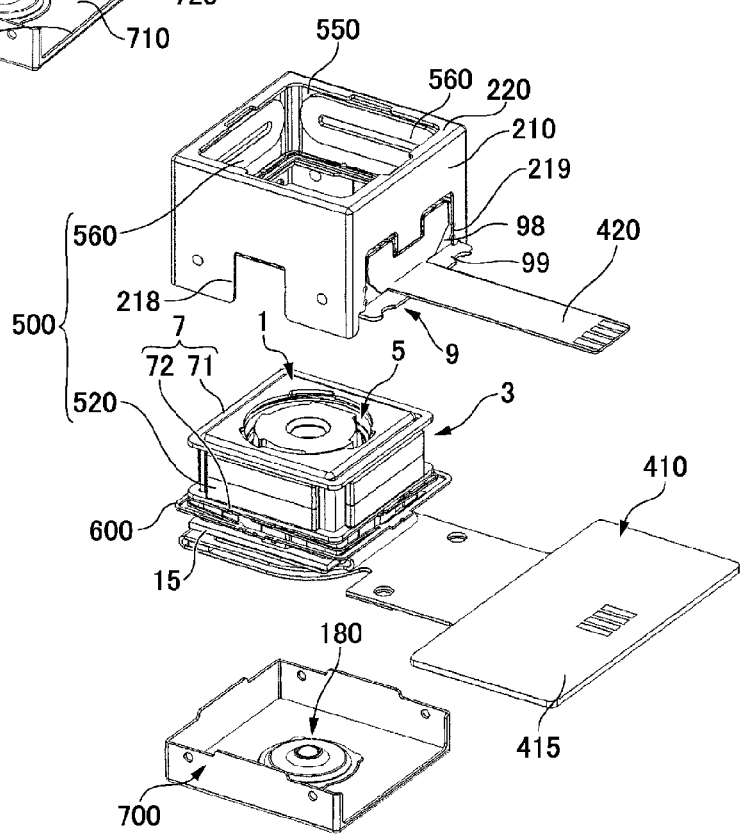
Figure 5:
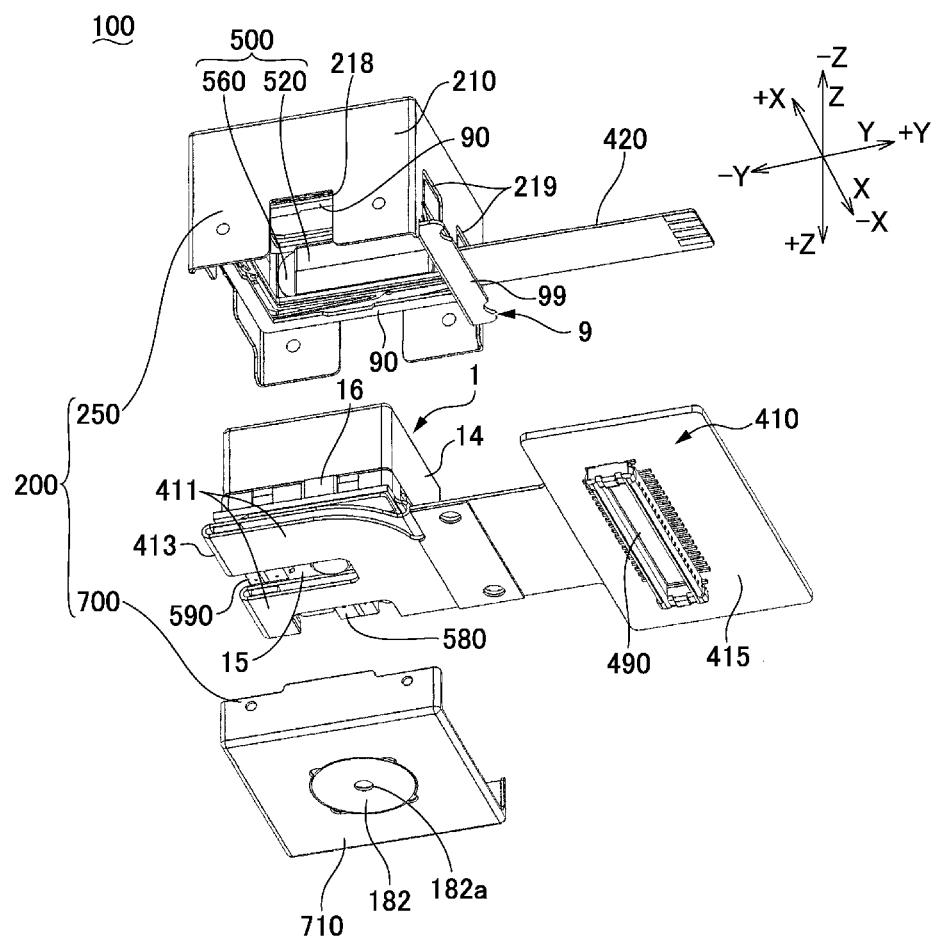
FIG. 5 is an exploded perspective view showing an optical unit with a shake correcting function in accordance with an embodiment of the present invention which is viewed from an opposite side to an object to be photographed side.
Figure 6:
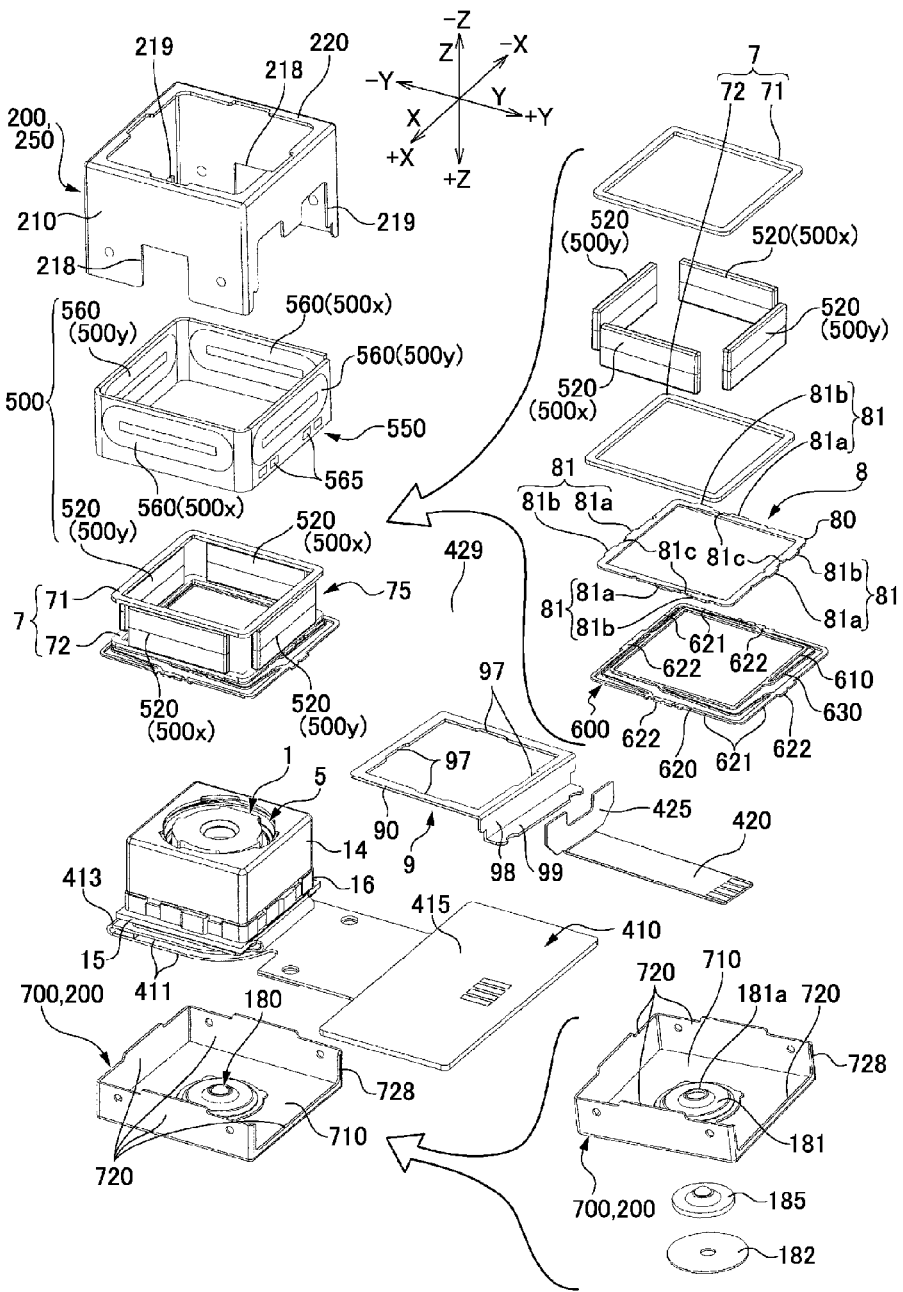
FIG. 6 is an exploded perspective view showing an optical unit with a shake correcting function in accordance with an embodiment of the present invention which is further exploded in detail.

FIGS. 4(a) and 4(b) are exploded perspective views showing the optical unit 100 with a shake correcting function in accordance with an embodiment of the present invention which is viewed from an object to be photographed side. FIG. 4(a) is an exploded perspective view showing a state in which the photographing unit 1, a lower cover and the like are detached from the optical unit 100, and FIG. 4(b) is an exploded perspective view showing a state in which a holder and the photographing unit 1 are connected with each other to structure the movable body. FIG. 5 is an exploded perspective view showing the optical unit 100 with a shake correcting function in accordance with an embodiment of the present invention which is viewed from an opposite side to an object to be photographed side. FIG. 6 is an exploded perspective view showing the optical unit 100 with a shake correcting function in accordance with an embodiment of the present invention which is further exploded in detail.

In FIGS. 3(a) and 3(b), FIGS. 4(a) and 4(b), FIG. 5 and FIG. 6, the optical unit 100 includes the fixed body 200, the movable body 3 provided with the photographing unit 1, a spring member 600 through which the movable body 3 is supported by the fixed body 200 so as to be capable of being displaced, and a shake correction drive mechanism 500 for generating a magnetic drive force between the movable body 3 and the fixed body 200 by which the movable body 3 is relatively displaced with respect to the fixed body 200.

The fixed body 200 is provided with an upper cover 250, a lower cover 700 and the like. The upper cover 250 is provided with a rectangular tube-shaped body part 210, which surrounds the movable body 3 provided with the photographing unit 1, and an end plate part 220 which closes an opening part on the object side of the rectangular tube-shaped body part 210. The end plate part 220 is formed with a window 220a through which light from an object to be photographed is incident. In the upper cover 250, an end part on the opposite side ("+Z" side) to the object side (side to which the optical axis "L" is extended) of the rectangular tube-shaped body part 210 is formed to be opened. Further, two side faces facing in the "X" direction of the rectangular tube-shaped body part 210 are formed with a cut-out portion 218 and two side faces facing in the "Y" direction are formed with a cut-out portion 219. The cut-out portion 219 located on the one side "+Y" in the "Y"-axis direction is utilized for connecting the flexible circuit board 420 with terminal parts of the sheet-shaped coil body 550 described below. Further, the cut-out portion 219 is utilized as an opening part for extending the flexible circuit board 410 to the outer side.

The Lower cover 700 is a press-worked product which is made of a metal plate and the lower cover 700 is provided with a substantially rectangular bottom plate part 710 and four side plate parts 720 which are stood up from an outer circumferential edge of the bottom plate part 710 toward the object side. Further, the side plate part 720 located on one side "+Y" in the "Y"-axis direction is formed with a cut-out portion 728, which is utilized to extend the flexible circuit board 410 to the outer side.

A swing support point 180 which is described below is structured at a center position of the bottom plate part 710 of the lower cover 700. Further, an inner face of the bottom plate part 710 is formed as a substantially mirror surface, which is utilized as a reflection face for a first photo reflector 580 and a second photo reflector 590 mounted on a circuit board 15 that is provided at a rear side end part in the optical axis direction of the photographing unit 1. The lower cover 700 is, for example, a metal member which is non-magnetized by heat treatment. Specifically, the lower cover 700 is a metal member which is structured of metal material such as SUS304 on which a bending work or a drawing work is performed in a predetermined shape. In a case that a bending work or a drawing work is performed on SUS304 or the like, a part of austenite is transferred to martensite which has magnetic property. However, in this embodiment, after the bending work or the drawing work is performed, a heat treatment is performed on the metal member to obtain the lower cover 700. Therefore, when the optical unit 100 is to be assembled, attraction and the like between the permanent magnet 520 and the lower cover 700 are prevented. In accordance with an embodiment of the present invention, in addition to the above-mentioned metal member, the lower cover 700 may be formed of nonmagnetic material such as aluminum, copper, copper alloy (for example, brass or nickel silver), or nonmagnetic material on which metal plating is performed.

(Structure of Movable Body 3)

In the optical unit 100 in this embodiment, the movable body 3 is structured of the photographing unit 1, a rectangular frame shaped holder 7 surrounding an outer peripheral face of a case 14 of the photographing unit 1, and a first stopper member 8. The first stopper member 8 is fixed to a rear side face in the optical axis direction of the holder 7 by a method of welding or the like. In this embodiment, the first stopper member 8 is, as described below, utilized as a first stopper part of a first stopper mechanism 810 which restricts a moving range in a direction perpendicular to the optical axis direction of the movable body 3. Further, the first stopper member 8 faces a second stopper member 9 (second stopper part) in the optical axis direction which is disposed on an inner side of a rectangular tube-shaped body part 210 of an upper cover 250 and structures a second stopper mechanism 820 which restricts a moving range in a direction perpendicular to the optical axis direction of the movable body 3.

The holder 7 is comprised of a first holder member 71 having a rectangular frame shape which is located on a front side in the optical axis direction and a second holder member 72 having a rectangular frame shape which is located on a rear side in the optical axis direction so as to face the first holder member 71. In this embodiment, flat plate-shaped permanent magnets 520 which are used in the shake correction drive mechanism 500 are held between the first holder member 71 and the second holder member 72. Specifically, the first holder member 71 is fixed to front side faces in the optical axis direction of the permanent magnets 520 and the second holder member 72 is fixed to rear side faces in the optical axis direction of the permanent magnets 520. The permanent magnets 520, the first holder member 71 and the second holder member 72 structure a permanent magnet assembly 75 in a rectangular tube shape. Therefore, after the photographing unit 1 is inserted into an inner side of the rectangular tube-shaped permanent magnet assembly 75, an outer peripheral face of the case 14 of the photographing unit 1 and the inner peripheral face of the permanent magnet assembly 75 (inner faces of the permanent magnets 520) are fixed to each other by an adhesive 73 (see FIGS. 8(b) and 8(c)) and, as a result, the permanent magnets 520, the first holder member 71, the second holder member 72, the first stopper member 8 and the photographing unit 1 are integrated with each other to structure the movable body 3.

(Structure of Spring Member 600)

The spring member 600 is a plate-shaped spring member which is provided with a fixed side connecting part 620 having a rectangular frame shape which is connected with the fixed body 200, a movable side connecting part 610 which is connected with the movable body 3, and a plurality of arm parts 630 which are extended between the movable side connecting part 610 and the fixed side connecting part 620. Both ends of the arm part 630 are respectively connected with the movable side connecting part 610 and the fixed side connecting part 620. In this embodiment, the fixed side connecting part 620 is provided with a main body portion 621 having a rectangular frame shape and protruded parts 622 which are protruded to outer sides at center positions of side portions of the main body portion 621.

In order to connect the spring member 600 with the movable body 3 and the fixed body 200, in this embodiment, the movable side connecting part 610 is fixed to the rear side end face in the optical axis direction of the first stopper member 8 by a method such as welding. Further, the fixed side connecting part 620 is fixed to front side end faces of the cut-out portions 218 and 219 of the upper cover 250 by a method such as welding in a state that the protruded parts 622 are fitted to the cut-out portions 218 and 219 of the upper cover 250. The spring member 600 is made of nonmagnetic metal such as copper alloy or nonmagnetic SUS steel material and is formed by performing press working or etching processing using a photo lithography technique on a thin plate having a certain thickness.

In this embodiment, when the movable side connecting part 610 of the spring member 600 is connected with the movable body 3 and the fixed side connecting part 620 is fixed to the fixed body 200, the movable body 3 is set in a pushed-up state to the front side in the optical axis direction by a swing support point 180. Therefore, the movable side connecting part 610 of the spring member 600 is in a pushed-up state to the front side in the optical axis direction with respect to the fixed side connecting part 620 and thus the arm parts 630 of the spring member 600 urges the movable body 3 to the rear side in the optical axis direction. Accordingly, the movable body 3 is in a state urged toward the swing support point 180 by the spring member 600 and the movable body 3 is in a supported state by the fixed body 200 so as to be capable of swinging by the swing support point 180.

(Structure of Shake Correction Drive Mechanism)

As shown in FIGS. 3(a) and 3(b), FIG. 6 and the like, in the optical unit 100 in this embodiment, the shake correction drive mechanism 500 is structured of coil parts 560 and the permanent magnets 520 which generate magnetic fields interlinking with the coil parts 560. Specifically, the flat plate-shaped permanent magnet 520 is fixed to each of four outer faces of the case 14 in the movable body 3 and the coil part 560 is disposed on an inner face of the rectangular tube-shaped body part 210 of the upper cover 250. The outer face and the inner face of the permanent magnet 520 are magnetized in different poles from each other. Further, the permanent magnet 520 is comprised of two magnet pieces which are disposed in the optical axis "L" direction and the faces of the magnet pieces facing the coil part 560 are magnetized in different poles from each other in the optical axis direction. Further, the coil part 560 is formed in a substantially quadrangular frame shape and its upper and lower long side portions are utilized as an effective side.

The permanent magnets 520 and the coil parts 560 which are disposed at two positions interposing the movable body 3 on both sides in the "Y"-axis direction structure a "Y"-side shake correction drive mechanism 500y and, as shown by the arrows "X1" and "X2" in FIG. 3(a), the "Y"-side shake correction drive mechanism 500y swings the movable body 3 with an axial line "X0" passing through the swing support point 180 and extending in the "X"-axis direction as a swing center. Further, the permanent magnets 520 and the coil parts 560 which are disposed at two positions interposing the photographing unit 1 on both sides in the "X"-axis direction structure an "X"-side shake correction drive mechanism 500x and, as shown by the arrows "Y1" and "Y2" in FIG. 3(b), the "X"-side shake correction drive mechanism 500x swings the movable body 3 with an axial line "Y0" passing through the swing support point 180 and extending in the "Y"-axis direction as a swing center.

In order to structure the "Y"-side shake correction drive mechanism 500y and the "X"-side shake correction drive mechanism 500x, in this embodiment, a sheet-shaped coil body 550 is used which is extended along four inner faces of the upper cover 250. In the sheet-shaped coil body 550, four coil parts 560 are integrally formed with a predetermined interval. Further, when the sheet-shaped coil body 550 is developed, the sheet-shaped coil body 550 is provided with a shape extending in a belt shape and is fixed to the inner face of the upper cover 250 by a method such as surface bonding in a state that the sheet-shaped coil body 550 is bent so as to be along the four inner faces of the upper cover 250.

The sheet-shaped coil body 550 is structured so that the coil part 560 made of a minute copper wiring line is formed on a printed circuit board by utilizing an electric conduction wiring technique. A plurality of copper wiring layers (coil part 560) is formed in multi-layer through an insulation film. Further, the surface of the copper wiring line (coil part 560) is covered with an insulation film. For example, an FP coil (fine pattern coil (registered mark)) made by ASAHI KASEI ELECTRONICS CO., LTD. may be used as the sheet-shaped coil body 550.

In this embodiment, a plurality of terminal parts 565 is formed in the sheet-shaped coil body 550 by using an electrically conducting layer extended from four coil parts 560. In this embodiment, the terminal parts 565 are disposed on an outer side of the sheet-shaped coil body 550 which is opposite to the inner side facing the permanent magnet 520. Further, the cut-out part 219 is formed in the portion of the upper cover 250 which is overlapped with the terminal parts 565. Therefore, since the terminal parts 565 of the sheet-shaped coil body 550 are exposed to the outer side, the sheet-shaped coil body 550 and an end part 425 of the flexible circuit board 420 which is bent toward the direction of the optical axis "L" are electrically connected with each other through the cut-out part 219 by soldering or the like.

A bent portion of the end part 425 of the flexible circuit board 420 is reinforced by a plate-shaped part 98 of the second stopper member 9 which is bent toward the rear side in the optical axis direction. The plate-shaped part 98 closes the cut-out portion 219 of the upper cover 250 together with the end part 425 of the flexible circuit board 420 to prevent entering of foreign matter such as dust. In this embodiment, a bent portion 99 of the second stopper member 9 which is bent from the rear end part of the plate-shaped part 98 toward the one side "+Y" in the "Y"-axis direction is utilized as a reinforced plate which supports the flexible circuit board 420.

In this embodiment, as described above, since the sheet-shaped coil body 550 is used, in comparison with a case that discrete air-core coils are separately used, a distance between the photographing unit 1 and the fixed body 200 can be narrowed and thus the size of the optical unit 100 can be reduced. Further, in the case of the sheet-shaped coil body 550, since a plurality of the coil parts 560 is integrally provided with the terminal parts 565, even when a plurality of coil parts 560 are required to be disposed at plural positions around the optical axis "L", it is sufficient that the sheet-shaped coil body 550 is extended around the optical axis "L". Therefore, different from a case that discrete air-core coils are separately used, discrete air-core coils are not required to be disposed at plural positions around the optical axis "L" and, in addition, discrete air-core coils are not required to be electrically connected and thus, according to this embodiment, assembly man-hours are reduced. Further, the terminal parts 565 of the sheet-shaped coil body 550 are disposed on the outer side which is an opposite side to the permanent magnet 520 and thus electrical connection with the coil parts 560, in other words, connection of the flexible circuit board 420 to the terminal parts 565 can be performed easily.

(Structure of Swing Support Point)

Figure 7A:
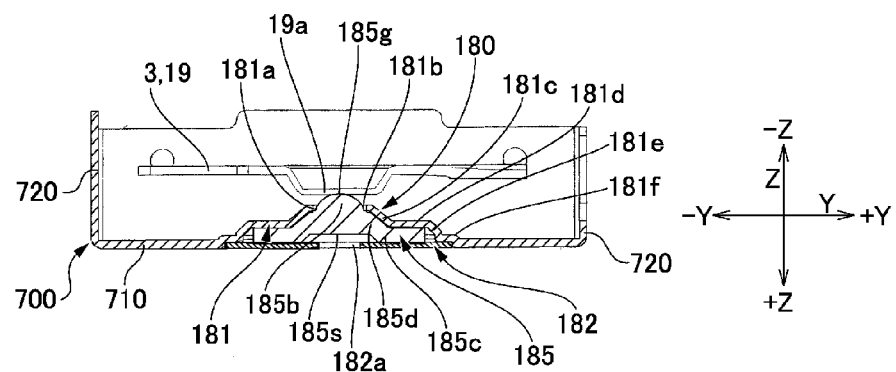
FIGS. 7(a) and 7(b) are explanatory views showing a swing support point in an optical unit with a shake correcting function in accordance with an embodiment of the present invention.
Figure 7B:
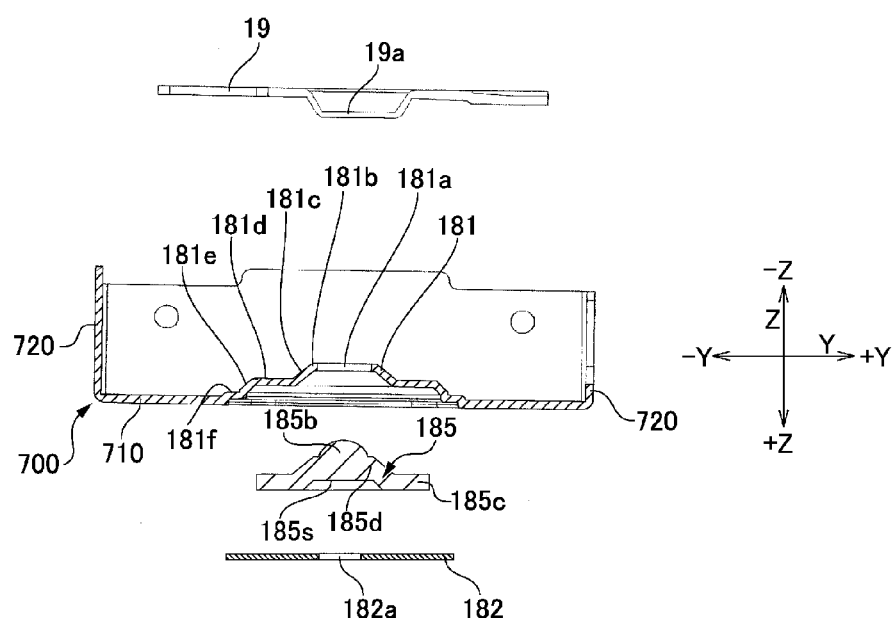

FIGS. 7(a) and 7(b) are explanatory views showing the swing support point in the optical unit 100 with a shake correcting function in accordance with an embodiment of the present invention. FIG. 7(a) is a "YZ" cross-sectional view showing the swing support point and the like and FIG. 7(b) is an explanatory view showing structural members structuring the swing support point.

On one side "+Z" in the "Z"-axis (opposite side to the object side) with respect to the photographing unit 1, the swing support point 180 for swinging the photographing unit 1 is provided between the photographing unit 1 and the lower cover 700 of the fixed body 200. The photographing unit 1 is urged toward the lower cover 700 by the spring member 600 through the swing support point 180 and is capable of being swung by the shake correction drive mechanism 500 with the swing support point 180 as a swing center to correct the shake.

In this embodiment, a portion of the fixed body 200 which is oppositely disposed to the rear end portion in the optical axis direction of the photographing unit 1 structuring the movable body 3 is provided with a first plate part 181 in which a hole 181a is formed, an elastic member 185 made of elastomer which is disposed so as to be superposed on the first plate part 181 on the rear side in the optical axis direction, and a second plate part 182 which is disposed so as to be superposed on the elastic member 185 on the rear side in the optical axis direction. The second plate part 182 holds the elastic member 185 in a compressed state between the first plate part 181 and the second plate part 182. In this embodiment, the first plate part 181 is comprised of a bottom plate portion having a recessed shape which is recessed toward the front side in the optical axis direction from a center portion of the bottom plate part 710 of the lower cover 700. The second plate part 182 is a circular support plate which is attached to the bottom plate part 710 of the lower cover 700 by welding or the like and a small hole 182a is formed at its center.

The elastic member 185 is formed in a roughly disk shape and its front side face in the optical axis direction is provided with a protruded part 185b, which is protruded in a hemispherical shape toward the front side in the optical axis direction at a position overlapping with the hole 181a, and a ring shaped flange part 185c which is extended around the protruded part 185b. The flange part 185c is held between the first plate part 181 and the second plate part 182. Further, the elastic member 185 is provided with a thick wall part 185d between the protruded part 185b and the flange part 185c and a circular recessed part 185s is formed at a center of the rear side face in the optical axis direction.

The first plate part 181 is provided with a circular bottom part 181b formed with the hole 181a, an inclined part 181c comprised of a conical face surrounding the bottom part 181b, a ring shaped flat plate part 181d which is extended around the inclined part 181c, an inclined part 181e comprised of a conical face surrounding the flat plate part 181d, and a ring shaped flat plate part 181f which is extended around the inclined part 181e. The second plate part 182 (support plate) is superposed on and fixed to the flat plate part 181f by welding or the like. In this state, the inclined part 181c and the flat plate part 181d of the first plate part 181 are abutted with the thick wall part 185d and the flange part 185c of the elastic member 185 to hold the elastic member 185 between the second plate part 182 and the first plate part 181.

As a result, a part of the protruded part 185b of the elastic member 185 is protruded in a hemispherical shape to the front side in the optical axis direction from the hole 181a of the first plate part 181 and a protruded portion 185g is abutted with the rear side end face in the optical axis direction of the photographing unit 1 as a pivot portion of the swing support point 180. In this embodiment, a portion of the photographing unit 1 with which the swing support point 180 is abutted is a portion 19a which is bent so as to protrude toward the rear side in the optical axis direction from the supporting plate 19 which is fixed to the rear side face in the optical axis direction of the circuit board 15.

In this embodiment, as described above, the portion of the fixed body 200 which is oppositely disposed to the rear end portion in the optical axis direction of the movable body 3 is provided with the first plate part 181 in which the hole 181a is formed, the elastic member 185 made of elastomer which is superposed and disposed on the rear side in the optical axis direction of the first plate part 181, and the second plate part 182 which is superposed and disposed on the rear side in the optical axis direction of the elastic member 185. The swing support point 180 is structured of the projected portion 185g of the elastic member 185 which is protruded to the movable body 3 through the hole 181a. Therefore, when an impact directing toward the rear side in the optical axis direction is applied to the movable body 3, since the impact is absorbed by the projected portion 185g of the elastic member 185, the bottom plate part 710 of the lower cover 700 (fixed body 200) is not deformed. Further, unnecessary vibration applied to the movable body 3 during control of a shake correction can be absorbed by the elastic member 185 and thus occurrence of resonance is prevented. In addition, in a case that the swing support point 180 is structured of a simple rubber product, control of its height dimension may be difficult. However, when the elastic member 185 is sandwiched by two plate parts (first plate part 181 and second plate part 182), the height dimension of the swing support point 180 can be secured with a sufficient degree of accuracy.

Further, the first plate part 181 is a bottom plate part 710 of the lower cover 700 (fixed body 200) and the second plate part 182 is a support plate which is fixed to the bottom plate part 710. Therefore, the elastic member 185 and the second plate part 182 (support plate) are successively superposed on the bottom plate part 710 of the lower cover 700 and thus assembling can be performed easily.

Further, the elastic member 185 is provided with the flange part 185c which is held between the first plate part 181 and the second plate part 182 around the hole 181a and the protruded part 185b which is protruded from the flange part 185c toward the inside of the hole 181a and thus rattling of the elastic member 185 is prevented from occurring between the first plate part 181 and the second plate part 182.

Further, the elastic member 185 is provided with the thick wall part 185d which is compressively deformed around the protruded part 185b and thus a high degree of an impact absorption effect and a high degree of a vibration proof effect are obtained by the elastic member 185.

Further, a face on the rear side in the optical axis direction of the elastic member 185 is provided with a recessed part 185s which is recessed toward the movable body 3 at a position overlapping with the hole 181a. Therefore, when an impact toward the rear side in the optical axis direction is applied to the movable body 3, a stress applied to the second plate part 182 through the elastic member 185 is relaxed.

(Structure of First Stopper Mechanism 810)

Figure 8A:
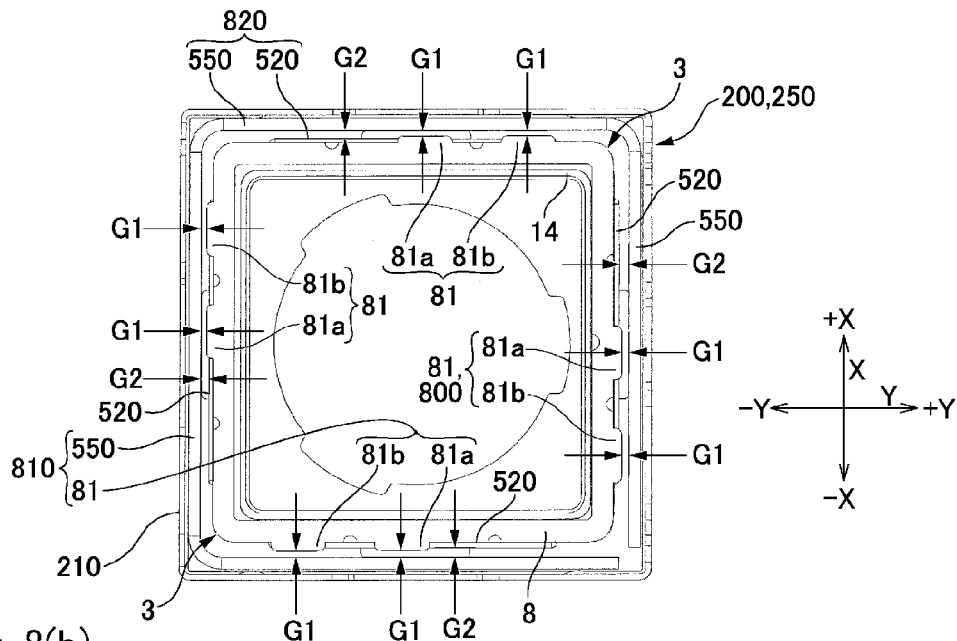
FIGS. 8(a), 8(b) and 8(c) are explanatory views showing a first stopper mechanism in an optical unit with a shake correcting function in accordance with an embodiment of the present invention.
Figure 8B:
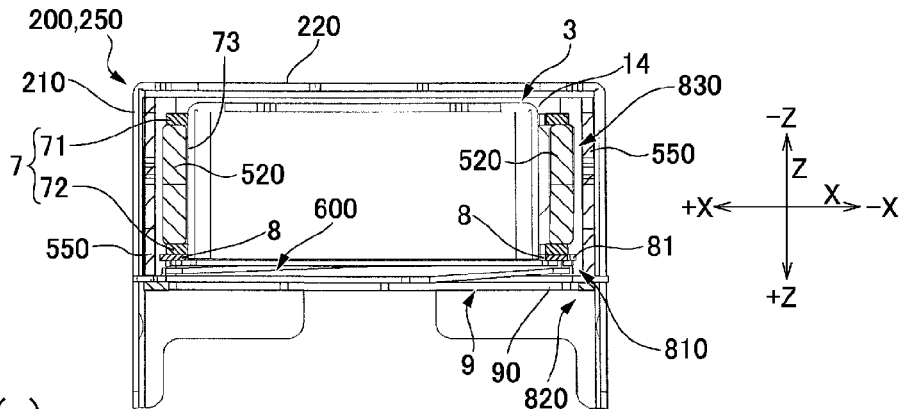
Figure 8C:
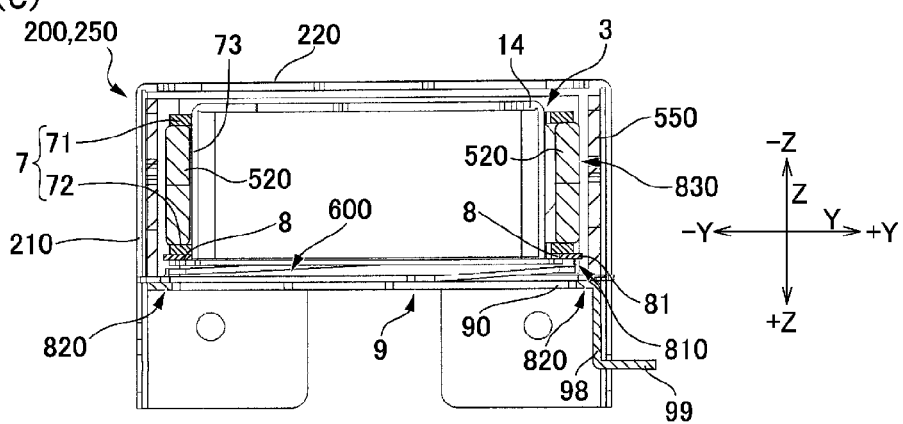

FIGS. 8(*a*), 8(*b*) and 8(*c*) are explanatory views showing a first stopper mechanism 810 in the optical unit 100 with a shake correcting function in accordance with an embodiment of the present invention. FIG. 8(*a*) is a bottom view showing structural members and the like structuring the first stopper mechanism 810 in the optical unit 100 which is viewed from the rear side in the optical axis direction, FIG. 8(*b*) is its "XZ" cross-sectional view, and FIG. 8(*c*) is its "YZ" cross-sectional view.

In the optical unit 100 in this embodiment, the movable body 3 is supported by the fixed body 200 in a state that the movable body 3 is capable of swinging through the swing support point 180. Therefore, when a large force is applied from the outside to displace the photographing unit 1 largely, the arm parts 630 of the spring member 600 may be plastically deformed. In order to prevent this problem, in this embodiment, a stopper mechanism which will be described below is provided.

In this embodiment, as shown in FIG. 6 and FIGS. 8(*a*), 8(*b*) and 8(*c*), a first stopper member 8 (first stopper part) having a rectangular frame shape is fixed to the rear side end face in the optical axis direction of the holder 7 of the movable body 3 by a method such as welding. In this embodiment, the holder 7 and the first stopper member 8 are made of metal and are fixed to each other by welding. An inner face of the holder 7 (an inner face of the first holder member 71 and an inner face of the second holder member 72) and an inner face of the stopper member 8 are located on the same face that is parallel to the optical axis and the first stopper member 8 is disposed with the inner face of the holder 7 as a reference. Therefore, positional accuracy between the first stopper member 8 and the permanent magnet 520 is enhanced. Further, the outer face of the permanent magnet 520 is disposed with the inner face of the holder 7 as a reference by a jig (not shown) or the like with a high degree of accuracy. Therefore, even when variation of a thickness of the permanent magnet 520 is occurred, a distance between the permanent magnet 520 and the sheet-shaped coil body 550 can be set with a high degree of accuracy.

In accordance with an embodiment of the present invention, when a thickness accuracy of the permanent magnet 520 is high, it may be structured that the inner side face of the permanent magnet 520 and the inner side face of the first stopper member 8 are located on the same plane that is parallel to the optical axis. In this case, the first stopper member 8 and the permanent magnet 520 are disposed with the same mounting tolerance and thus the first stopper member 8 and the permanent magnet 520 are disposed with a high degree of positional accuracy.

Further, the first stopper member 8 is provided with a main body portion 80 having a rectangular frame shape which is disposed along an outer peripheral face of the movable body 3 and a protruded part 81 which is protruded to an outer side from the main body portion 80 and the protruded part 81 is protruded to an outer side with respect to the permanent magnet 520. In this embodiment, the protruded part 81 is formed in each of four side portions of the main body portion 80. Further, the protruded part 81 is comprised of a first protruded part 81*a* and a second protruded part 81*b* provided at a position separated from the first protruded part 81*a* in an extending direction of the side portion in each of the four side portions of the main body portion 80. A small recessed part 81*c* which is utilized when the first stopper member 8 is to be fixed to the holder 7 by welding or the like is formed between the first protruded part 81*a* and the second protruded part 81*b*. In this embodiment, the protruded part 81 is disposed at a displaced position from the center of the side portion in the same circumferential direction in each of the four side portions of the main body portion 80 and the protruded parts 81 are located at point-symmetrical positions on the side portions oppositely disposed to each other. In this embodiment, portions of the first stopper member 8 which correspond to a portion between the first protruded part 81*a* and the second protruded part 81*b* are fixed to the rear side end face in the optical axis direction of the holder 7 by a method such as welding.

The protruded part 81 faces the sheet-shaped coil body 550 which is provided on the fixed body 200 through a narrow gap space "G1". Therefore, the protruded part 81 and the sheet-shaped coil body 550 structure a first stopper mechanism 810, which determines a moving range when the movable body 3 is displaced in a direction perpendicular to the optical axis direction, between the shake correction drive mechanism 500 and the swing support point 180 in the optical axis direction. Specifically, the protruded part 81 and the sheet-shaped coil body 550 structure the first stopper mechanism 810, which determines a moving range of the movable body 3 by abutting the protruded part 81 with the sheet-shaped coil body 550 when the movable body 3 is displaced in a direction perpendicular to the optical axis direction, between the shake correction drive mechanism 500 and the spring member 600 in the optical axis direction in a portion between the shake correction drive mechanism 500 and the swing support point 180.

In a case of the sheet-shaped coil body 550, different from an air-core coil, a wound coil is not loosened even when the coil is abutted with the permanent magnet 520. Therefore, a portion with which the protruded part 81 is abutted may be either of a portion of the sheet-shaped coil body 550 where the coil part 560 is structured and a portion where the coil part 560 is not structured. However, in this embodiment, a portion with which the protruded part 81 is abutted is set to be a portion of the sheet-shaped coil body 550 where the coil part 560 is not structured.

Further, the sheet-shaped coil body 550 and the permanent magnet 520 are oppositely disposed to each other through a narrow gap space "G2" and the gap space "G2" is a slightly larger than the gap space "G1" between the protruded part 81 and the sheet-shaped coil body 550. Therefore, the sheet-shaped coil body 550 and the permanent magnets 520 structure a third stopper mechanism 830 which determines a swing range when the movable body 3 is swung.

A portion of the sheet-shaped coil body 550 with which the permanent magnets 520 is abutted may be either of a portion where the coil part 560 is structured and a portion where the coil part 560 is not structured. However, in this embodiment, a portion of the sheet-shaped coil body 550 with which the permanent magnets 520 are abutted is set to be a portion where the coil part 560 is structured. According to this third stopper mechanism 830, a swing range of the movable body 3 can be set with a high degree of accuracy. In other words, in the shake correction drive mechanism 500, a distance between the sheet-shaped coil body 550 and the permanent magnet 520 is set with a high degree of accuracy and thus, when the third stopper mechanism 830 is structured by utilizing the sheet-shaped coil body 550 and the permanent magnet 520, a swing range of the movable body 3 is set with a high degree of accuracy.

As described above, in this embodiment, the protruded part 81 protruded from one of the fixed body 200 and the movable body 3 is capable of being abutted with the other of the fixed body 200 and the movable body 3 and, in this manner, the stopper mechanism 810 is provided for determining the moving range when the movable body 3 is displaced in the direction perpendicular to the optical axis direction. Specifically, in this embodiment, the first stopper mechanism 810 is provided for determining the moving range when the movable body 3 is displaced in the direction perpendicular to the optical axis direction by abutting the protruded part 81 protruded from the movable body 3 with the fixed body 200 side. Therefore, even when an impact is applied to the movable body 3 to displace the movable body 3 in the direction perpendicular to the optical axis direction, the moving range of the movable body 3 is restricted. Accordingly, the spring member 600 is prevented from being plastically deformed and damaged. Further, the protruded part 81 (stopper mechanism 810) is provided between the shake correction drive mechanism 500 and the swing support point 180 in the optical axis direction. Therefore, for example, in comparison with a case that the protruded part 81 is provided on the front side with respect to the shake correction drive mechanism 500 in the optical axis direction at a position separated from the swing support point 180, the stopper mechanism 810 is operated with a little displaced amount of the movable body 3. Accordingly, the spring member 600 can be surely prevented from being plastically deformed.

Further, the protruded part 81 (stopper mechanism 810) is provided between the shake correction drive mechanism 500 and the spring member 600 in the optical axis direction. Therefore, the moving range when the movable body 3 is displaced in the direction perpendicular to the optical axis direction can be restricted further narrow and thus the spring member 600 is prevented from being plastically deformed further surely.

Further, the protruded part 81 is provided so as to protrude to the sheet-shaped coil body 550 side with respect to the permanent magnet 520 from the movable body 3 and, when the movable body 3 is largely displaced in the direction perpendicular to the optical axis direction, the protruded part 81 is abutted with the sheet-shaped coil body 550. Therefore, the moving range when the movable body 3 is displaced in the direction perpendicular to the optical axis direction can be set with a high degree of accuracy and thus the moving range when the movable body 3 is displaced in the direction perpendicular to the optical axis direction is restricted without disturbing the swing of the movable body 3. In other words, in the shake correction drive mechanism 500, a distance between the sheet-shaped coil body 550 and the permanent magnet 520 is set with a high degree of accuracy and thus, when it is structured so that the protruded part 81 is abutted with the sheet-shaped coil body 550, a distance between the protruded part 81 and the sheet-shaped coil body 550 is also set with a high degree of accuracy. Accordingly, the moving range when the movable body 3 is displaced in the direction perpendicular to the optical axis direction is set with a high degree of accuracy.

Further, the movable body 3 includes the holder 7 having a frame shape which holds the permanent magnets 520 and the first stopper member 8 having a frame shape having the protruded parts 81 which is fixed to the rear side end face in the optical axis direction of the holder 7. Therefore, before the first stopper member 8 is fixed, the permanent magnet 520 can be magnetized in a state that the permanent magnet 520 is fixed to the holder 7 and thus handling of the permanent magnet 520 is easy. Further, since the holder 7 and the first stopper member 8 are discretely structured, a magnetizing process can be performed in a state before the first stopper member 8 is fixed to the holder 7 and thus, when the magnetizing process is to be performed, the protruded part 81 structuring the stopper mechanism 810 does not disturb. Therefore, the magnetizing can be performed without requiring an unnecessary gap space between the permanent magnet 520 and a magnetizing head.

Further, the inner face of the holder 7 (the inner face of the first holder member 71 and the inner face of the second holder member 72) to which the permanent magnets 520 are fixed and the inner face of the first stopper member 8 are located on the same plane that is parallel to the optical axis. In other words, the first stopper member 8 is disposed with the inner face of the holder 7 as a reference. Therefore, positional accuracy between the first stopper member 8 and the permanent magnet 520 can be enhanced.

Further, a connected portion of the spring member 600 with the movable body 3 is the first stopper member 8. Therefore, since the spring member 600 is connected with the first stopper member 8 which is fixed with a high degree of accuracy, the spring constant of the spring member 600 can be set with a high degree of accuracy.

Further, the protruded part 81 is provided as the first protruded part 81*a* and the second protruded part 81*b* which are separated from each other in each of four side portions of a quadrangular shape. Therefore, even when a force in a twisting direction is applied to the movable body 3, in comparison with a case that only one protruded part 81 is provided in each of the side portions, either one of the first protruded part 81*a* and the second protruded part 81*b* is operated as the first stopper mechanism 810. Accordingly, since a large force in the twisting direction is not applied to the movable body 3, the spring member 600 is prevented from being plastically deformed in the twisting direction.

(Structure of Second Stopper Mechanism 820)

Figure 9A:
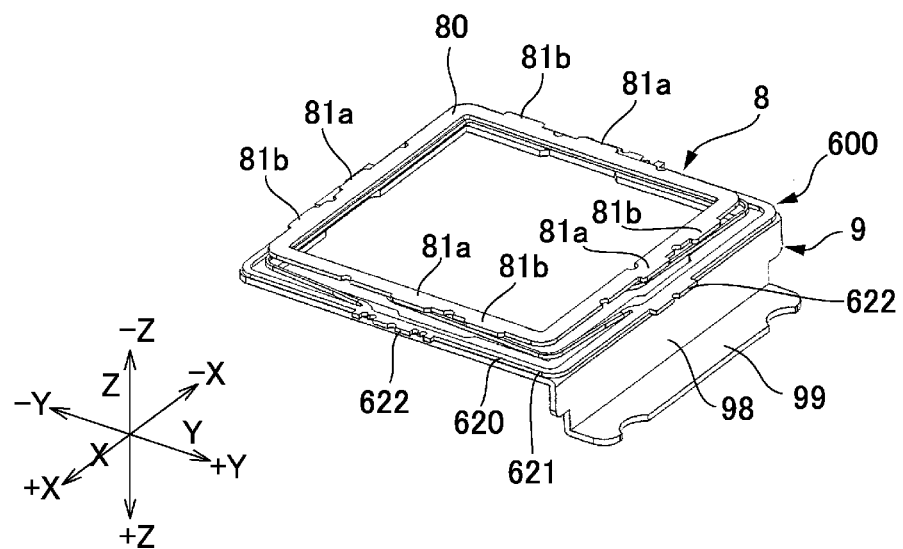
FIGS. 9(a) and 9(b) are explanatory views showing an entire structure of a second stopper mechanism in an optical unit with a shake correcting function in accordance with an embodiment of the present invention.
Figure 9B:
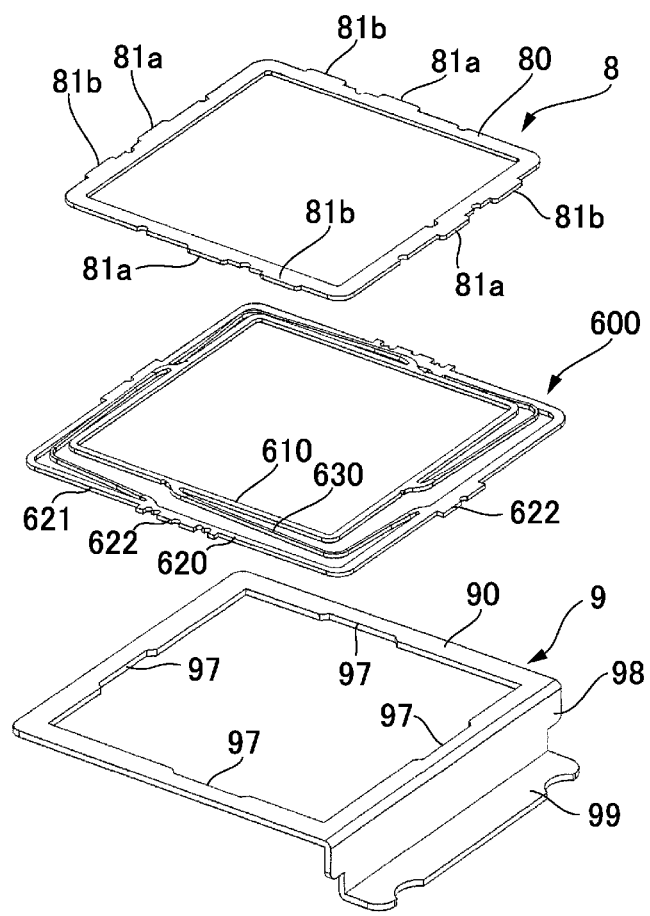
Figure 10A:
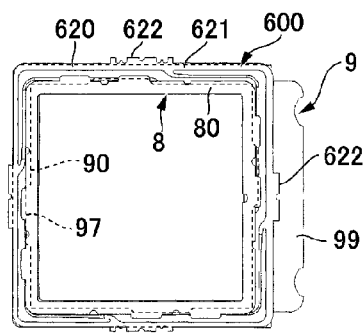
FIGS. 10(a) through 10(g) are explanatory views showing a planar structure of a second stopper mechanism in an optical unit with a shake correcting function in accordance with an embodiment of the present invention.
Figure 10A:
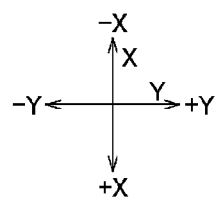
Figure 10B:
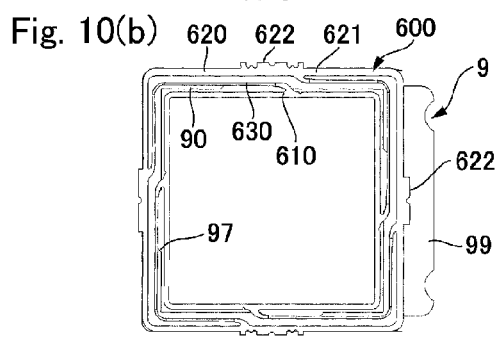
Figure 10E:
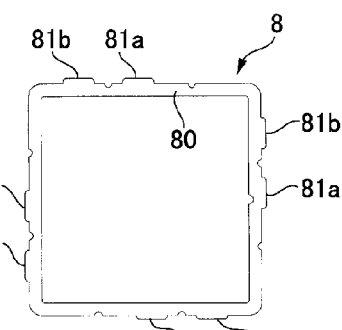
Figure 10C:
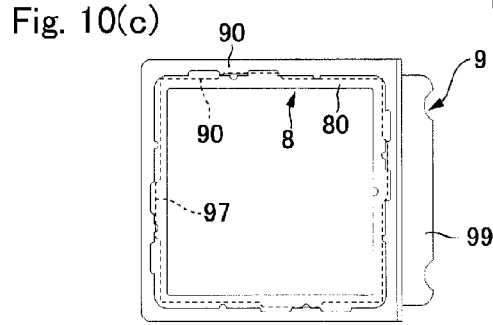
Figure 10F:
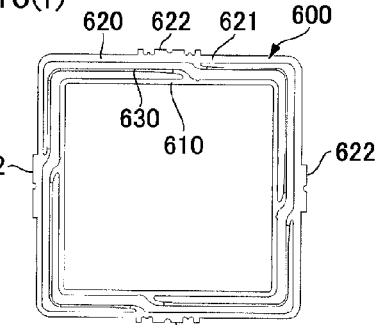
Figure 10D:
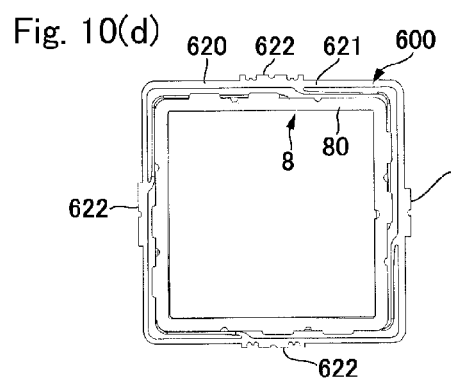
Figure 10G:
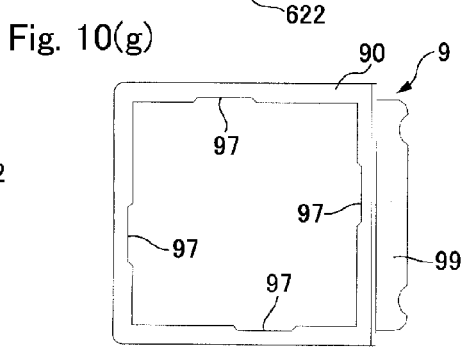
Figure 11:
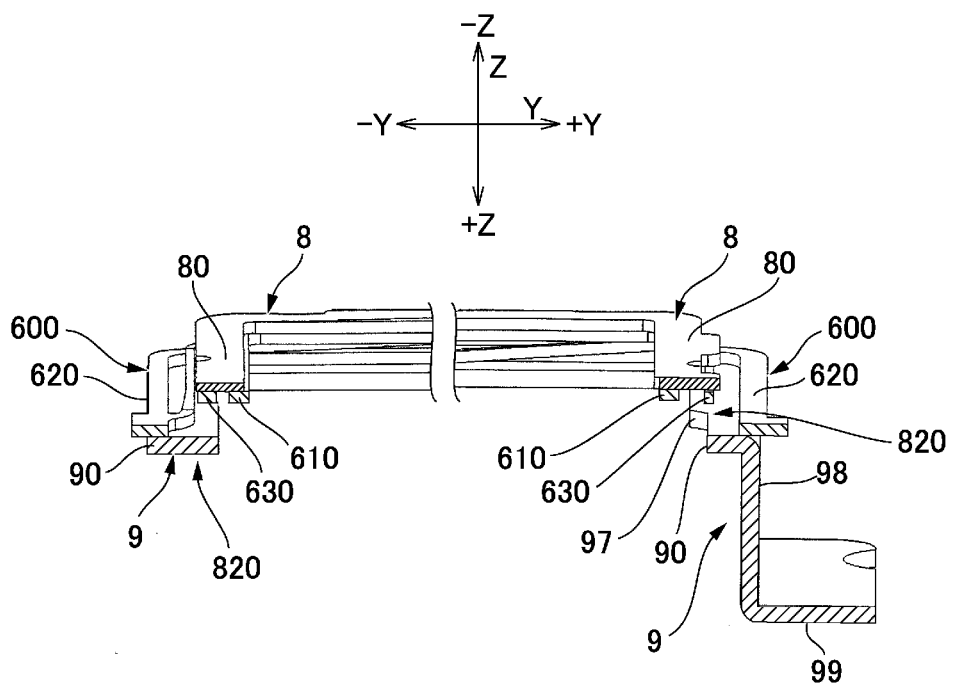
FIG. 11 is an enlarged cross-sectional view showing a second stopper mechanism in an optical unit with a shake correcting function in accordance with an embodiment of the present invention.

FIGS. 9(*a*) and 9(*b*) are explanatory views showing an entire structure of a second stopper mechanism 820 in the optical unit 100 with a shake correcting function in accordance with an embodiment of the present invention. FIG. 9(*a*) is a perspective view showing structural members and the like which structure the second stopper mechanism 820 in the optical unit 100 which is viewed from the front side in the optical axis direction, and FIG. 9(*b*) is its exploded perspective view. FIGS. 10(*a*) through 10(*g*) are explanatory views showing a planar structure of the second stopper mechanism 820 in the optical unit 100 with a shake correcting function in accordance with an embodiment of the present invention. FIG. 10(*a*) is a plan view showing the second stopper mechanism 820 which is viewed from the front side in the optical axis direction, FIG. 10(*b*) is a plan view showing the second stopper mechanism 820 from which the first stopper member 8 is detached, FIG. 10(*c*) is a plan view showing the second stopper mechanism 820 from which the spring member 600 is detached, FIG. 10(*d*) is a plan view showing the second stopper mechanism 820 from which the second stopper member 9 is detached, FIG. 10(*e*) is a plan view showing the first stopper member 8, FIG. 10(*f*) is a plan view showing the spring member 600, and FIG. 10(*g*) is a plan view showing the second stopper member 9. FIG. 11 is an enlarged cross-sectional view showing the second stopper mechanism 820 in the optical unit 100 with a shake correcting function in accordance with an embodiment of the present invention.

As shown in FIGS. 3(*a*) and 3(*b*), FIG. 5 and FIGS. 8(*a*), 8(*b*) and 8(*c*), in the optical unit 100 with a shake correcting function in this embodiment, the second stopper member 9 (second stopper part) is fixed to the upper cover 250 which is used as the fixed body 200. As shown in FIGS. 9(*a*) and 9(*b*), FIGS. 10(*a*) through 10(*g*), and FIG. 11, the second stopper member 9 is provided with a frame part 90 having a rectangular frame shape which is disposed on an inner side of the rectangular tube-shaped body part 210 of the upper cover 250, a plate-shaped part 98 which is bent from the frame part 90 toward the rear side in the optical axis direction, and a portion 99 which is bent from the rear end part of the plate-shaped part 98 to one side in the "Y"-axis direction. Each of four side portions of the frame part 90 is formed with a cut-out portion 97 in a trapezoid shape at a position displaced to one side from the center position.

In this embodiment, the second stopper member 9 is fixed to the upper cover 250 by welding or the like in a state that the frame part 90 having a rectangular frame shape is located on the inner side of the rectangular tube-shaped body part 210 of the upper cover 250. In this embodiment, the second stopper member 9 and the upper cover 250 are made of metal and the second stopper member 9 is fixed to the upper cover 250 by welding. Specifically, the frame part 90 is welded to an inner edge of the cut-out portion 218 of the upper cover 250 and the plate-shaped part 98 is welded to an inner edge of the cut-out portion 219 of the upper cover 250.

In this state, the frame part 90 of the second stopper member 9 is located on the rear side in the optical axis direction with respect to the spring member 600 so as to face the spring member 600. In this embodiment, an outer shape dimension of the frame part 90 of the second stopper member 9 is larger than an outer shape dimension of the main body portion 80 having a rectangular frame shape of the first stopper member 8 but the outer shape dimension of the main body portion 80 of the first stopper member 8 is larger than an inner shape dimension of the frame part 90 of the second stopper member 9. Therefore, the frame part 90 of the second stopper member 9 faces the first stopper member 8 on the rear side in the optical axis direction through the spring member 600.

Further, the whole or roughly the whole or a part of each of the plurality of the arm parts 630 of the spring member 600 is overlapped with the frame part 90 of the second stopper member 9 in the optical axis direction. Further, the arm part 630 of the spring member 600 is overlapped with the first protruded part 81a and the second protruded part 81b of the first stopper member 8 in the optical axis direction, and the first protruded part 81a and the second protruded part 81b are overlapped with the frame part 90 of the second stopper member 9 in the optical axis direction. Therefore, a part of the arm part 630 of the spring member 600 is overlapped with both of the first stopper member 8 and the second stopper member 9 in the optical axis direction.

As described above, in the optical unit 100 in this embodiment, the first protruded part 81a and the second protruded part 81b of the first stopper member 8 face the frame part 90 of the second stopper member 9 in the optical axis direction through the arm part 630 of the spring member 600 to structure the second stopper mechanism 820 and the second stopper mechanism 820 determines a moving range of the movable body 3 to the rear side in the optical axis direction. Therefore, even when an impact is applied to the movable body 3 and the movable body 3 is displaced to the rear side in the optical axis direction, the moving range of the movable body 3 is restricted and thus the spring member 600 is prevented from being plastically deformed and damaged. Further, even when an impact is applied to the movable body 3, the movable body 3 is not abutted with the first plate part 181 of the swing support point 180 strongly and thus the imaging element 1b mounted on the movable body 3 and bonding wires, die bonding and the like which are electrically connected with the imaging element 1b are not damaged.

In addition, in this embodiment, when the movable body 3 is displaced to the rear side in the optical axis direction, the first stopper member 8 and the second stopper member 9 are abutted with each other through the spring member 600.

Therefore, in order to structure the second stopper mechanism 820, a structure is not required to be adopted in which the first stopper member 8 and the second stopper member 9 are abutted with each other while avoiding the spring member 600. Accordingly, a structure surrounding the spring member 600 can be simplified. Further, when the movable body 3 is displaced to the rear side in the optical axis direction, the first stopper member 8 and the second stopper member 9 are abutted with each other through the arm parts 630 of the spring member 600. Therefore, when the second stopper mechanism 820 is operated, the arm parts 630 are sandwiched and protected by the first stopper member 8 and the second stopper member 9 and thus the arm parts 630 are prevented from being plastically deformed.

Further, the first stopper member 8 is utilized in order to determine both of the moving range in the direction perpendicular to the optical axis direction and the moving range in the optical axis direction of the movable body 3 and, in addition, the first stopper member 8 and the second stopper member 9 are provided on both sides interposing the spring member 600 in the optical axis direction and thus, when the second stopper mechanism 820 is operated, twisting is hard or difficult to occur in the spring member 600. Further, since the first stopper member 8 and the second stopper member 9 are provided on both sides interposing the spring member 600 in the optical axis direction, a large space is not required for providing the second stopper mechanism 820.

In addition, the first stopper member 8 and the second stopper member 9 are provided on the whole periphery around the optical axis and thus a large force does not concentrate on a part of the first stopper member 8 and a part of the second stopper member 9. Therefore, the first stopper member 8 and the second stopper member 9 are hard or difficult to be damaged and the movable body 3 is prevented from being largely inclined on an opposite side to the abutting portion due to reaction when the first stopper member 8 and the second stopper member 9 are abutted with each other. Accordingly, plastic deformation of the spring member 600 is prevented surely.

Further, the outer shape dimension of the first stopper member 8 is larger than the inner shape dimension of the second stopper member 9 and thus the first stopper member 8 and the second stopper member 9 are abutted with each other through the spring member 600 in a face-to-face manner. Therefore, the first stopper member 8 and the second stopper member 9 are hard or difficult to be damaged. Further, since the first stopper member 8 and the second stopper member 9 are abutted with each other in a face-to-face manner through the spring member 600, the movable body 3 is prevented from being largely inclined on a side other than the abutting portion due to reaction when the first stopper member 8 and the second stopper member 9 are abutted with each other. Therefore, plastic deformation of the spring member 600 is prevented surely.

In addition, the second stopper member 9 is fixed to the upper cover 250 of the fixed body 200 which covers the movable body 3 by welding and thus the upper cover 250 can be reinforced by the second stopper member 9. Therefore, even when the upper cover 250 is made of a thin metal plate, deformation of the upper cover 250 can be prevented.

In addition, the second stopper member 9 is provided with the frame part 90 disposed on the whole periphery around the optical axis of the movable body 3 and the plate-shaped part 98 which is bent in the optical axis direction from the frame part 90 on a side where the flexible circuit board 420 is extended from the inner side of the fixed body 200. The plate-shaped part 98 closes the cut-out portion 219 (opening part) from which the flexible circuit board 420 is extended. Therefore, foreign matters such as dust are prevented from entering through the cut-out portion 219.

Further, the whole or roughly the whole or a part of the arm part 630 of the spring member 600 is superposed on the second stopper member 9 in the optical axis direction and thus the second stopper mechanism 820 can be structured by utilizing the region where the arm parts 630 are extended. Therefore, a large space is not required for providing the second stopper mechanism 820.

(Shake Correcting Operation)

In the optical unit 100 in this embodiment, when the optical device 1000 shown in FIG. 1 is shaken, the shake is detected by a gyroscope and the host control section controls the shake correction drive mechanism 500 based on a detection result by the gyroscope. In other words, a drive current for cancelling the shake which is detected by the gyroscope is supplied to the coil parts 560 of the sheet-shaped coil body 550 through the flexible circuit board 410 and the flexible circuit board 420. As a result, the "X"-side shake correction drive mechanism 500x swings the photographing unit 1 around the "Y"-axis with the swing support point 180 as a swing center. Further, the "Y"-side shake correction drive mechanism 500y swings the photographing unit 1 around the "X"-axis with the swing support point 180 as the swing center. Further, when the swing around the "X"-axis and the swing around the "Y"-axis of the photographing unit 1 are combined with each other, the photographing unit 1 is displaced over the entire "X-Y" plane. Accordingly, all shakes occurred in the optical unit 100 can be corrected surely. When the photographing unit 1 is to be driven, the displacement of the photographing unit 1 is monitored by the first photo reflector 580 and the second photo reflector 590 shown in FIG. 5.

(Structure of Flexible Circuit Board 410)

As shown in FIGS. 3(*a*) and 3(*b*), FIG. 5 and the like, in the optical unit 100 in this embodiment, one end part of the flexible circuit board 410 is connected with the circuit board 15 of the photographing unit 1. In a case that the photographing unit 1 is to be swung, when the flexible circuit board 410 applies a load to the photographing unit 1, an appropriate swing of the photographing unit 1 may be obstructed.

In order to prevent this problem, the main body portion 415 of the flexible circuit board 410 which is located on an outer side of the optical unit 100 is formed in a wide width so as to be capable of mounting a connector 490 and being connected with the flexible circuit board 420. However, a portion of the flexible circuit board 410 which is located on an inner side of the optical unit 100 is formed in two strip-shaped portions 411 whose width dimension is narrower than the main body portion 415. Therefore, there is no problem to make the swing support point 180 abut with the movable body 3. Further, a portion of the flexible circuit board 410 which is located on the inner side of the optical unit 100 is formed to be two strip-shaped portions 411 whose width dimension is narrow and thus the rigidity of the strip-shaped portion 411 is relaxed. Therefore, the strip-shaped portion of the flexible circuit board 410 is capable of following a shake of the movable body 3 smoothly and thus a large load is not applied to the movable body 3.

Further, the strip-shaped portion 411 is extended from one side "+Y" in the "Y"-axis direction toward the other side "−Y" and then, the strip-shaped portion 411 is folded back toward the one side "+Y" and, after that, an end part of the strip-shaped portion 411 is folded back along an edge of the circuit board 15 so as to be directed toward a circuit board face on the object side of the circuit board 15 and fixed. Therefore, since the flexible circuit board 410 is provided with the folded-back portion 413 between the main body portion 415 disposed on the outer side and the portion fixed to the circuit board 15 and thus its dimension is long. Accordingly, the strip-shaped portion of the flexible circuit board 410 is capable of following a shake of the photographing unit 1 smoothly and thus a large load is not applied to the movable body 3.

In addition, the folded-back portion 413 of the flexible circuit board 410 is located at the same height position as the swing center of the movable body 3 in the swing support point 180 (abutting position of the projected portion 185g with the movable body 3). Therefore, when the movable body 3 is swung, the displacement of the strip-shaped portion 411 is restrained small. Accordingly, affection of the flexible circuit board 410 applied to the movable body 3 is reduced and the movable body 3 is swung with a high degree of accuracy.

[Other Embodiments]

In the embodiment described above, the first stopper member 8 is provided on the front side in the optical axis direction with respect to the spring member 600 and the second stopper member 9 is provided on the rear side in the optical axis direction with respect to the spring member 600. However, it may be structured that the first stopper member 8 is provided on the rear side in the optical axis direction with respect to the spring member 600 and the second stopper member 9 is provided on the front side in the optical axis direction with respect to the spring member 600.

In the embodiment described above, the first stopper part is structured of the first stopper member 8 formed in a frame shape and the second stopper part is structured of the second stopper member 9 formed in a frame shape. However, it may be structured that the first stopper part is structured of a protruded part provided in the holder 7 or the like of the movable body 3 and the second stopper part is structured of a frame part or the like provided in the upper cover 250.

In the embodiments described above, the present invention is, as an example, applied to the optical unit 100 which is used in a cell phone with a camera. However, the present invention may be applied to the optical unit 100 which is used in a thin digital camera or the like. Further, in the embodiment described above, a lens drive mechanism and the like are structured in the photographing unit 1. However, the present invention may be applied to a fixed focus type optical unit in which no lens drive mechanism is mounted on the photographing unit 1.

In addition, other than a cell phone, a digital camera and the like, the optical unit 100 with a shake correcting function to which the present invention is applied may be fixed in an apparatus such as a refrigerator in which vibration is occurred in a certain interval and mounted so as to be capable of being remote controlled. According to the apparatus, a service can be provided in which information in the inside of the refrigerator is obtained at a visit place, for example, at the time of shopping. According to this service, the camera system is provided with an attitude stabilizing device and thus a stable image can be transmitted even when vibration may occur in the refrigerator. Further, this device may be fixed to a device such as a bag, a satchel or a cap of a child and a student which is carried at a time of commuting or attending school. In this case, a state of surroundings is photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to the camera module, the position of a target person can be obtained simultaneously and thus, when an accident occurs, its position and situation can be confirmed immediately. In addition, when the optical unit 100 with a shake correcting function to which the present invention is applied is mounted at a position which is capable of photographing toward a front side in a car, it can be used as a drive recorder. Further, it may be structured that the optical unit 100 with a shake correcting function to which the present invention is applied is mounted at a position which is capable of photographing toward a front side in a car and a front side image is photographed automatically at a constant interval, which is automatically transmitted to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correcting function to which the present invention is applied may be applied to shake correction of an optical device from which a light beam is emitted such as a laser beam pointer, a portable or on-vehicle projection display device and direct viewing type display device. Further, in an observation system with a high magnification such as an astronomical telescope system or a binocular system, the optical unit 100 may be used to observe without using an auxiliary locking device such as a three-legged support. In addition, when the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correcting function comprising:
    a fixed body;
    a movable body which holds an optical element;
    a swing support point which supports the movable body between a rear end portion in an optical axis direction of the movable body and the fixed body so that the movable body is capable of swinging;
    a spring member which is formed in a plate shape and is provided with a fixed body side connecting part connected with the fixed body, a movable body side connecting part connected with the movable body, and an arm part connected with the fixed body side connecting part and the movable body side connecting part, the spring member urging the movable body toward the swing support point;
    a shake correction drive mechanism which is structured to swing the movable body with the swing support point as a swing center;
    a first stopper part which is protruded in a direction perpendicular to the optical axis direction on one side of a front side and a rear side in the optical axis direction of the movable body with respect to the spring member for determining a moving range of the movable body when the movable body is displaced in the direction perpendicular to the optical axis direction; and
    a second stopper part which is structured to face the first stopper part in the optical axis direction through the spring member on the other side of the front side and the rear side in the optical axis direction of the fixed body with respect to the spring member for determining a moving range of the movable body to the other side in the optical axis direction by restricting movement of the first stopper part when the movable body is displaced to the other side in the optical axis direction.

2. The optical unit with a shake correcting function according to claim 1, wherein when the movable body is displaced to the other side in the optical axis direction, the first stopper part and the second stopper part are abutted with each other through the spring member.

3. The optical unit with a shake correcting function according to claim 2, wherein when the movable body is displaced to the rear side in the optical axis direction, at least a part of the arm part is sandwiched by the first stopper part and the second stopper part.

4. The optical unit with a shake correcting function according to claim 1, wherein
    the first stopper part is provided on the front side in the optical axis direction with respect to the spring member, and
    the second stopper part is provided on the rear side in the optical axis direction with respect to the spring member and, when the movable body is displaced to the rear side in the optical axis direction, the second stopper part restricts movement of the first stopper part for determining a moving range of the movable body to the rear side in the optical axis direction.

5. The optical unit with a shake correcting function according to claim 4, wherein the shake correction drive mechanism is a magnetic drive mechanism which is provided on the front side in the optical axis direction with respect to the first stopper part.

6. The optical unit with a shake correcting function according to claim 5, wherein
    the shake correction drive mechanism includes a sheet-shaped coil body fixed to the fixed body and a permanent magnet fixed to the movable body, and
    the first stopper part is provided with a protruded part which is protruded toward the sheet-shaped coil body side with respect to the permanent magnet and, when the movable body is displaced in the direction perpendicular to the optical axis direction, the protruded part is abutted with the sheet-shaped coil body to restrict displacement of the movable body.

7. The optical unit with a shake correcting function according to claim 4, wherein
    the movable body includes a photographing unit having a lens and an imaging element as the optical element, a holder having a rectangular frame shape which surrounds an outer peripheral face of a case of the photographing unit, and the first stopper part,
    the first stopper part is fixed to a face on the rear side in the optical axis direction of the holder, the movable side connecting part of the spring member is fixed to a rear side end face of the first stopper part in the optical axis direction, and the second stopper part is disposed so as to face the arm part of the spring member on the rear side in the optical axis direction with respect to the spring member.

8. The optical unit with a shake correcting function according to claim 7, wherein the case of the photographic unit formed in a rectangular box shape, and a lens drive mechanism for driving the lens in a focusing direction is provided on an inner side of the case.

9. The optical unit with a shake correcting function according to claim 1, wherein the first stopper part and the second stopper part are provided on the whole periphery around an optical axis.

10. The optical unit with a shake correcting function according to claim 9, wherein the first stopper part is structured of a first stopper member having a frame shape along an outer peripheral face of the movable body, and the second stopper part is structured of a second stopper member having a frame shape along an inner peripheral face of a cover of the fixed body which covers the movable body.

11. The optical unit with a shake correcting function according to claim 10, wherein each of the first stopper member and the second stopper member is formed in a rectangular frame shape, and an outer shape dimension of the rectangular frame shape of the first stopper member is larger than an inner shape dimension of the rectangular frame shape of the second stopper member.

12. The optical unit with a shake correcting function according to claim 11, wherein the second stopper member is fixed to the cover by welding.

13. The optical unit with a shake correcting function according to claim 10, wherein the second stopper member comprises:

a frame part which is disposed on the whole periphery of the movable body around the optical axis and structures the frame shape; and a plate-shaped part which is bent in the optical axis direction from the frame part on a side where a flexible circuit board is extended out from an inner side of the fixed body for closing an opening part of the fixed body through which the flexible circuit board is extended out.

14. The optical unit with a shake correcting function according to claim 10, wherein the whole or a part of the arm part of the spring member is overlapped with the second stopper member in the optical axis direction.

15. The optical unit with a shake correcting function according to claim 1, further comprising an elastic member having a protruded portion which is protruded toward the movable body at a portion of the fixed body facing a rear end portion of the movable body in the optical axis direction, wherein the swing support point is structured by abutting the protruded portion of the elastic member with the rear end portion of the movable body in the optical axis direction.

16. The optical unit with a shake correcting function according to claim 15, wherein the spring member comprises:

a fixed side connecting part having a rectangular frame shape which is connected with the fixed body;

a movable side connecting part which is connected with the movable body; and a plurality of arm parts which are extended between the movable side connecting part and the fixed side connecting part;

wherein when the movable side connecting part of the spring member is connected with the movable body and the fixed side connecting part is fixed to the fixed body, the movable side connecting part of the spring member is pushed up by the protruded portion of the elastic member to a front side in the optical axis direction with respect to the fixed side connecting part and thereby the movable body is supported by the protruded portion of the elastic member so as to be capable of being swung.

* * * * *